(12) United States Patent
Linden et al.

(10) Patent No.: US 12,510,222 B2
(45) Date of Patent: Dec. 30, 2025

(54) HEADLAMP PROTECTOR UNIT HAVING A DEFLECTOR CONFIGURED TO MOVE A VEHICLE FENDER

(71) Applicant: Ford Global Technologies, LLC, Dearborn, MI (US)

(72) Inventors: Bernd Linden, Neunkirchen-Seelscheid (DE); Bert Niessen, Heimbach (DE); Jana Meuleman, Cologne (DE); Gregor Extra, Jülich-Barmen (DE); Ilja Buerkle, Cologne (DE); Ines Steinke, Odenthal (DE); Stefan Boennemann, Cologne (DE); Wilhelm Heger, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 18/612,381

(22) Filed: Mar. 21, 2024

(65) Prior Publication Data

US 2025/0297717 A1   Sep. 25, 2025

(51) Int. Cl.
*F21S 41/20*   (2018.01)
*B60Q 1/04*   (2006.01)
*F21W 107/10*   (2018.01)

(52) U.S. Cl.
CPC ............ *F21S 41/285* (2018.01); *B60Q 1/045* (2013.01); *B60Q 1/0491* (2013.01); *F21W 2107/10* (2018.01)

(58) Field of Classification Search
CPC ........ B60Q 1/0491; F21S 45/10; F21S 41/285
See application file for complete search history.

(56) References Cited

U.S. PATENT DOCUMENTS 10,788,187 B2 *   9/2020   Willeke ............... B60Q 1/0441

FOREIGN PATENT DOCUMENTS

| CN | 112325239 A | 2/2021 | |
|---|---|---|---|
| DE | 102012000953 A1 * | 9/2012 | ........... B60Q 1/0416 |
| DE | 102012005496 A1 | 11/2012 | |
| DE | 102018001097 A1 | 8/2018 | |
| KR | 20030031679 A | 4/2003 | |
| KR | 20040088287 A | 10/2004 | |
| KR | 20070020694 A | 2/2007 | |
| WO | 2006117455 A1 | 11/2006 | |

* cited by examiner

*Primary Examiner* — Robert J May
(74) *Attorney, Agent, or Firm* — Vichit Chea; Carlson, Gaskey & Olds, P.C.

(57) ABSTRACT

A method and an apparatus include a housing, a headlamp comprising at least a lens portion fixed to the housing at a connection interface, and a fender supported by a vehicle structure relative to the housing such that an edge of the fender at least partially overlaps the connection interface. A deflector is associated with the connection interface and is configured to move the fender outwardly relative to the vehicle structure in response to an input load to the headlamp.

24 Claims, 4 Drawing Sheets

HEADLAMP PROTECTOR UNIT HAVING A DEFLECTOR CONFIGURED TO MOVE A VEHICLE FENDER

TECHNICAL FIELD

This disclosure relates generally to a structure that moves a headlamp into a protective open space during an input load event to protect the headlamp, and more specifically to a deflector that pushes a fender outwards so that the headlamp can move rearwardly.

BACKGROUND

A vehicle includes headlamps that are fixed to a vehicle body structure, which is arranged in a front region of the vehicle. There is a desire to protect and preserve the headlamps in response to front input load events.

SUMMARY

An apparatus according to an exemplary aspect of the present disclosure includes, among other things: a housing; a headlamp comprising at least a lens portion fixed to the housing at a connection interface; a fender supported by a vehicle structure relative to the housing such that an edge of the fender at least partially overlaps the connection interface; and a deflector associated with the connection interface and configured to move the fender outwardly relative to the vehicle structure in response to an input load to the headlamp.

In a further non-limiting embodiment of the foregoing apparatus, the headlamp extends from an inboard end near a bumper to an outboard end adjacent to the fender, and wherein the connection interface is at the outboard end.

In a further non-limiting embodiment of any of the foregoing apparatus, when the input load is applied to the inboard end, a pivot point area is created at a transition area between the outboard end of the headlamp and the fender.

In a further non-limiting embodiment of any of the foregoing apparatus, pivoting movement of the deflector during the input load results in direct contact between the deflector and an inner surface of the fender to push the fender outwardly in a lateral direction while moving the headlamp rearwardly in a longitudinal direction.

In a further non-limiting embodiment of any of the foregoing apparatus, the fender is adhered to the housing and the connection interface comprises a flange area associated with the housing.

In a further non-limiting embodiment of any of the foregoing apparatus, the edge of the fender extends outwardly of the connection interface to cover the flange area from external view.

In a further non-limiting embodiment of any of the foregoing apparatus, the deflector comprises a polygonal body that is attached to a flange of the housing.

In a further non-limiting embodiment of any of the foregoing apparatus, the polygonal body includes a ribbed structure.

In a further non-limiting embodiment of any of the foregoing apparatus, a bumper mounting bracket at least partially covers the polygonal body.

In a further non-limiting embodiment of any of the foregoing apparatus, the deflector comprises a polygonal body that pivots in response to the input load and contacts an inner surface of the fender to move the fender outwardly in a lateral direction while moving the headlamp rearwardly in a longitudinal direction.

A method according to an exemplary aspect of the present disclosure includes, among other things: fixing at least a lens portion of a headlamp to a housing at a connection interface; supporting a fender supported on a vehicle structure relative to the housing such that an edge of the fender at least partially overlaps the connection interface; and associating a deflector with the connection interface such that in response to an input load to the headlamp, the fender moves outwardly relative to the vehicle structure.

In a further non-limiting embodiment of the foregoing method, the headlamp extends from an inboard end to an outboard end, and the method includes positioning the connection interface at the outboard end.

In a further non-limiting embodiment of any of the foregoing methods, when the input load is applied to the inboard end, a pivot point area is created at a transition area between the outboard end of the headlamp and the fender.

In a further non-limiting embodiment of any of the foregoing methods, pivoting movement of the deflector during the input load results in direct contact between the deflector and an inner surface of the fender to push the fender outwardly in a lateral direction while moving the headlamp rearwardly in a longitudinal direction.

In a further non-limiting embodiment of any of the foregoing methods, the method includes adhering the fender to the housing such that the connection interface comprises a flange area associated with the housing.

In a further non-limiting embodiment of any of the foregoing methods, the method includes extending the edge of the fender outwardly of the connection interface to cover the flange area from external view.

In a further non-limiting embodiment of any of the foregoing methods, the deflector comprises a polygonal body that is attached to a flange of the housing.

In a further non-limiting embodiment of any of the foregoing methods, the method includes forming the polygonal body to include a ribbed structure.

In a further non-limiting embodiment of any of the foregoing methods, the meth includes mounting a bumper mounting bracket to at least partially cover the polygonal body.

In a further non-limiting embodiment of any of the foregoing methods, the deflector comprises a polygonal body that pivots in response to the input load and contacts an inner surface of the fender to move the fender outwardly in a lateral direction while moving the headlamp rearwardly in a longitudinal direction.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed to providing a structure to move a headlamp assembly into a protective open space during an input load event to protect the headlamp. An edge of a fender is positioned at one end of a headlamp housing and when an opposite end of the headlamp contacts a barrier, a rotation is initiated around a vertical axis at the one end of the headlamp housing. This rotation uses a transition between the headlamp and the fender as a pivot point. During this rotation, a deflector that is attached to a flange of the headlamp pushes the fender outwardly so that the headlamp can move rearwardly. In order to protect an associated lens from an edge of the fender during retraction, the headlamp has an additional deflector surface on the housing, which keeps the fender at a distance from the headlamp during retraction via the bumper mounting bracket, which is attached to the fender.

In order to make the vehicles comparable and to be able to classify a vehicle in an insurance class at a start of production, a series of input load tests are carried out to optimize the repair process. Affected components for these types of tests typically include a bumper, a bumper cover, and a headlamp assembly located on a side of the vehicle subject to the input load. The subject disclosure provides a configuration where the headlamps are movable into a protective open space in response to a front input load to protect the headlamp.

Figure 1:
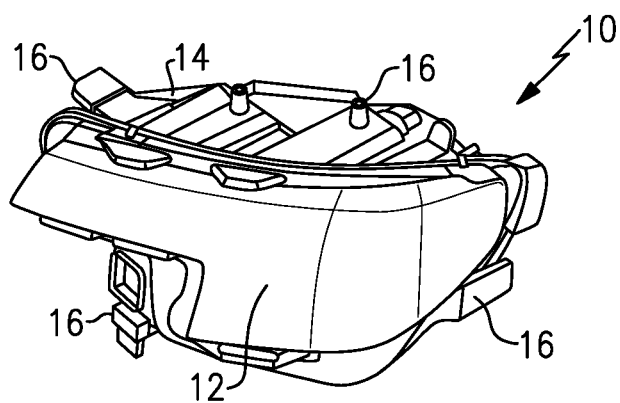
FIG. 1 illustrates a perspective view of a headlamp assembly.

FIG. 1 shows an example of a headlamp assembly 10 comprising a lens 12 supported by a headlamp housing 14. In this example, the headlamp housing 14 comprises a plurality of attachment segments 16, which may break away or slip out of fastening in the event of an input load event to allow the headlamp to move.

Figure 2:
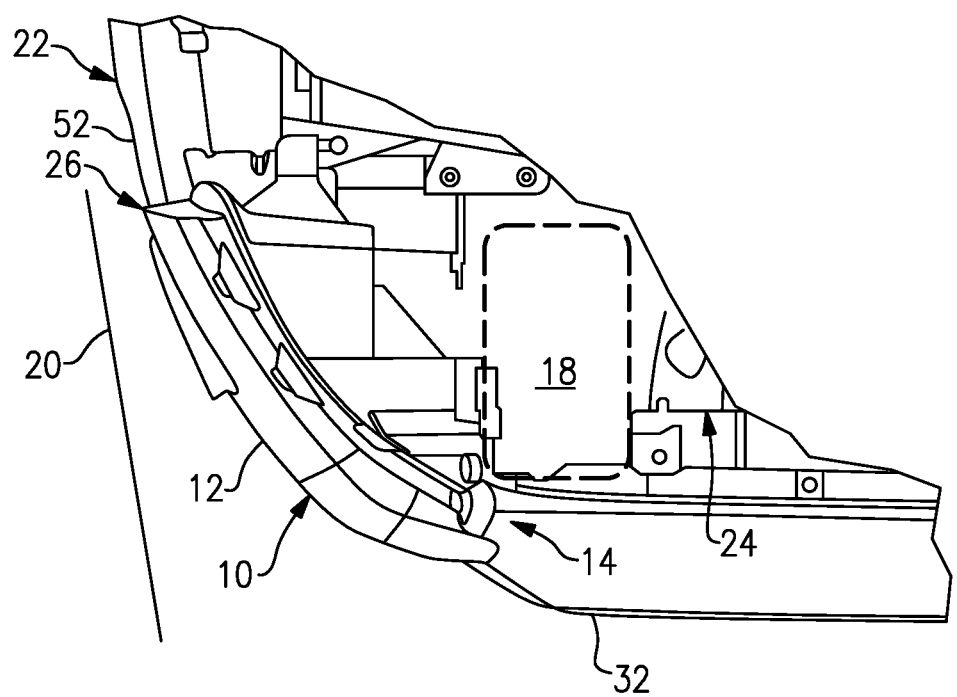
FIG. 2 is a top view of a headlamp assembly in relation to a barrier.

FIG. 2 shows an example of the headlamp assembly 10 that includes a protective open space area 18 behind the headlamp assembly 10. This area 18 can be empty or filled with deformable components that can be easily compressed during the input load event. A barrier 20 is shown in a position relative to a front of the a vehicle 22, and the protective open space area 18 is shown between a rear of the headlamp assembly 12 and other rearward vehicle components 24. Arrow 26 indicates a typical first input point for contact between the barrier 20 and the headlamp assembly 10.

Figure 3:
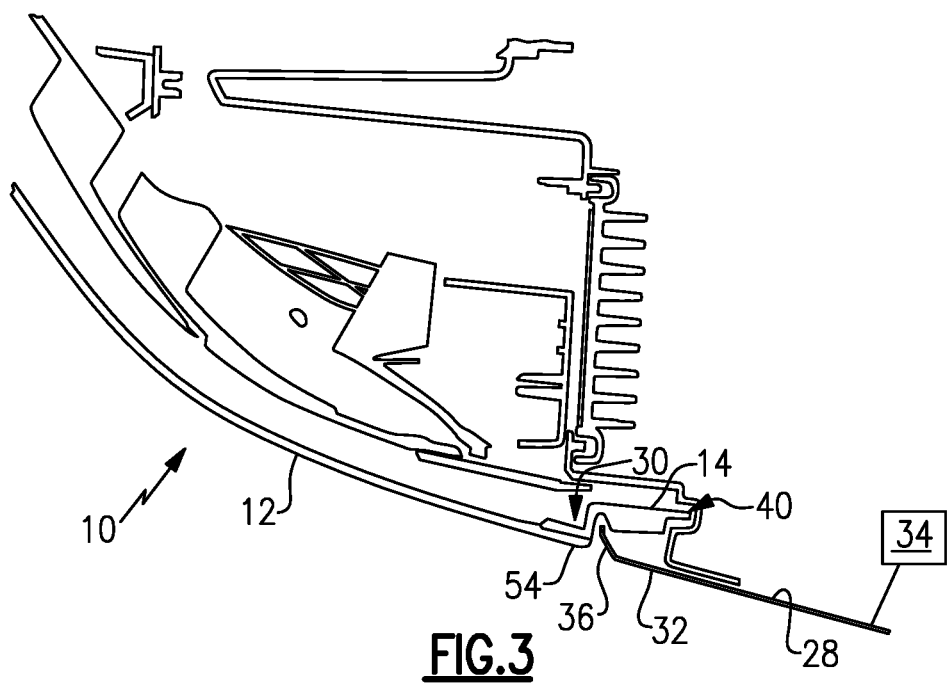
FIG. 3 is a top section view of a headlamp assembly in relation to an edge of a fender.

FIG. 3 shows the headlamp housing 14 and a portion of the lens 12 that are fixed to each other at a connection interface 30. A fender 32 is supported by a vehicle structure, schematically indicated at 34, relative to the housing 14 such that an edge 36 of the fender 32 at least partially overlaps the connection interface 30. A deflector 38 is associated with the connection interface 30 and is configured to move the fender 32 outwardly relative to the vehicle structure 34 in response to an input load to the headlamp assembly 10. The deflector 38 pivots about a vertical axis A in response to the input load and contacts an inner surface 28 of the fender 32 to move the fender 32 outwardly in a lateral direction while moving the headlamp assembly 10 rearwardly in a longitudinal direction. In one example, as the fender 32 moves outwardly, the headlamp assembly 10 moves into the protective open space area 18 (FIG. 2).

In one example, the fender 32 is adhered to the housing 14 and the connection interface 30 comprises a flange area 40 associated with the housing 14. The edge 36 of the fender 32 extends outwardly of the connection interface 30 to cover the flange area 40 from external view for aesthetic purposes.

Figure 4:
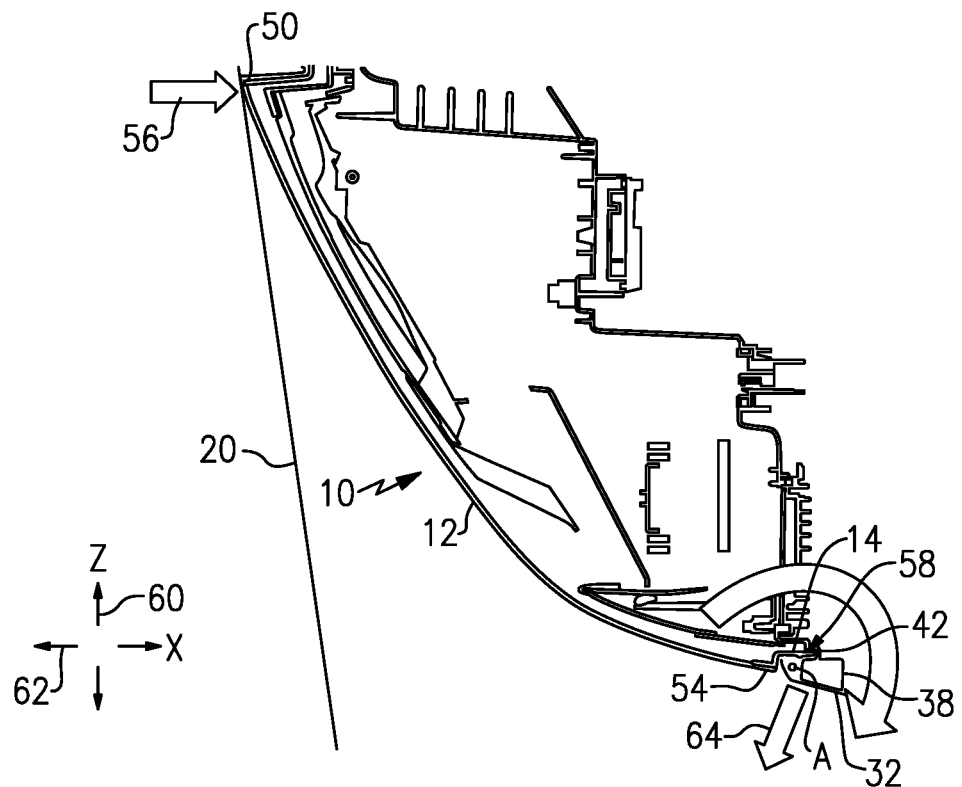
FIG. 4 is a top section view of a headlamp assembly with a deflector in relation to an edge of a fender prior to an input load.
Figure 5:
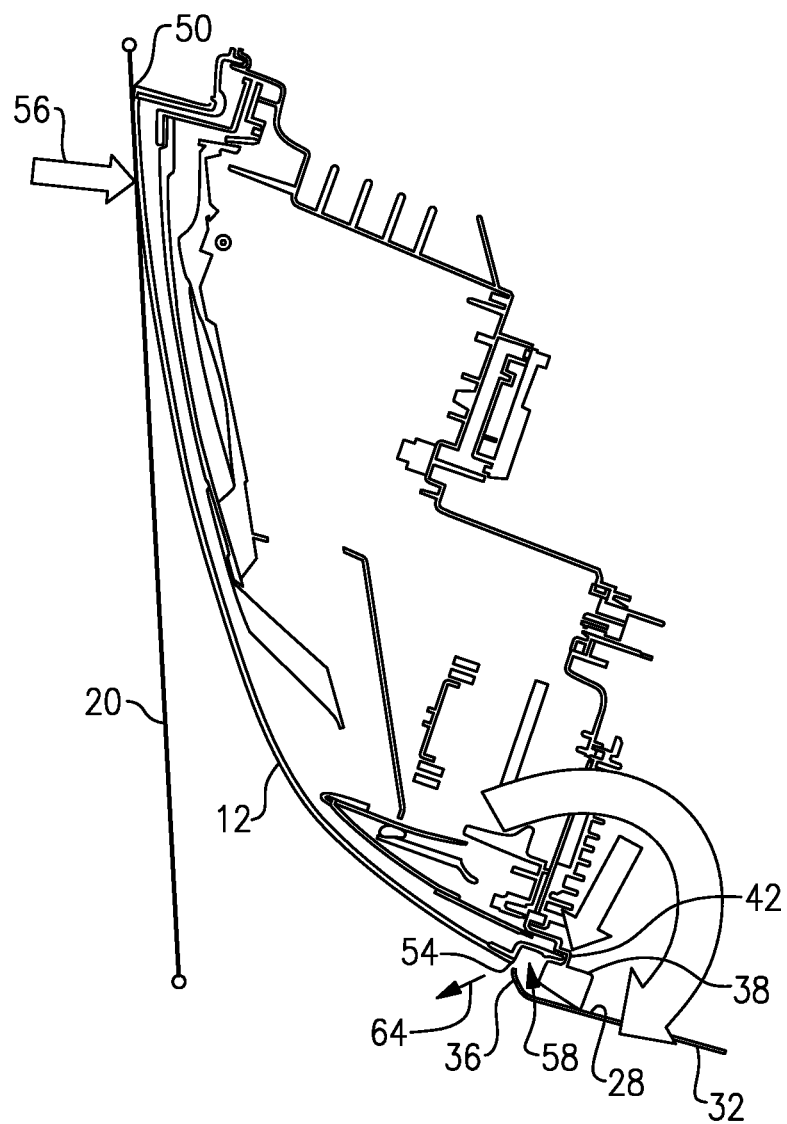
FIG. 5 is a view similar to FIG. 4 but shows the deflector in relation to the edge of the fender after an input load.
Figure 6:
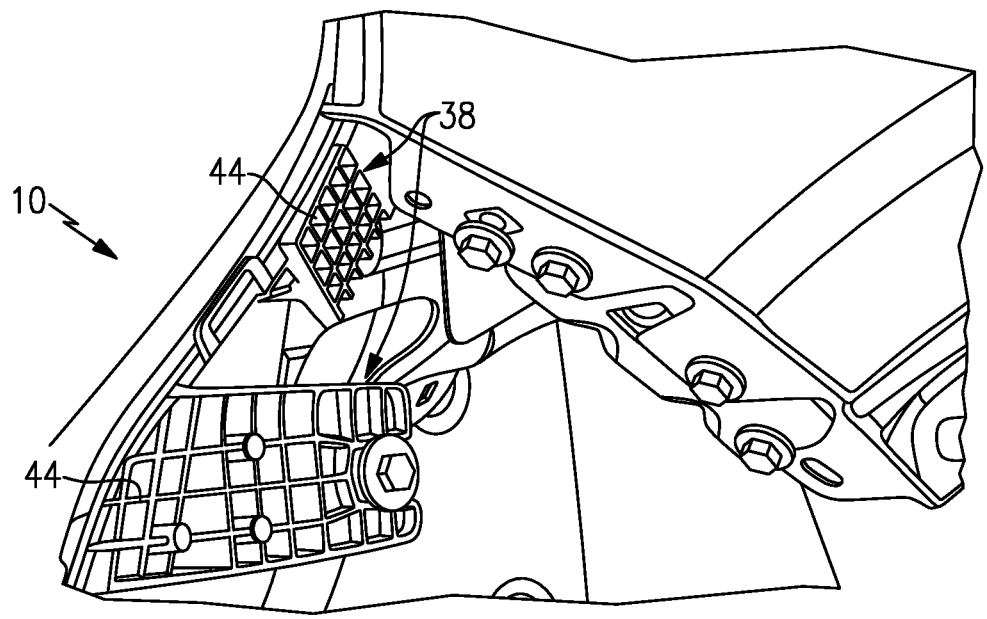
FIG. 6 is a perspective view of the deflector without a bumper mounting bracket.

In one example shown in FIGS. 4-5, the deflector 38 comprises a polygonal body that is attached to a flange 42 of the housing 14. In one example, the polygonal body includes a ribbed structure 44 as shown in FIG. 6.

In one example, a bumper mounting bracket 46 (FIG. 7) at least partially covers the polygonal body of the deflector 38 and is attached to the fender.

As discussed above, in one example, the housing 14 and a portion of the lens 12 are adhered, e.g., glued, together. This creates a bed area 40 on the housing 14. The edge 36 of the fender 32 is intended to prevent external viewers from seeing through the gap and has a minimum length for stamping reasons. As shown in FIG. 3, movement of the headlamp assembly 10 is hindered by the fender 32, and the headlamp assembly 10 may not be protected when resistance to the fender 32 is overcome during an input load event. Thus, the headlamp assembly 10 cannot be moved rearwardly because the fender 32 obstructs the path of the headlamp assembly 10 in the direction of movement.

As shown in FIG. 4, the headlamp assembly 10 extends from an inboard end 50 near a vehicle front bumper 52 (FIG. 2) to an outboard end 54 near the fender 32. The connection interface 30 between the housing 14 and the lens 12 is at the outboard end 54. When the input load is applied to the inboard end 50 (see arrow 56), a pivot point area 58 is created at a transition area between the outboard end 54 of the headlamp assembly 10 and the fender 32. Pivoting movement of the deflector 38 during the input load results in direct contact between the deflector 38 and the inner surface 28 of the fender 32 to push the fender 32 outwardly in a lateral direction 60 while moving the headlamp assembly 10 rearwardly in a longitudinal direction 62.

Figure 7:
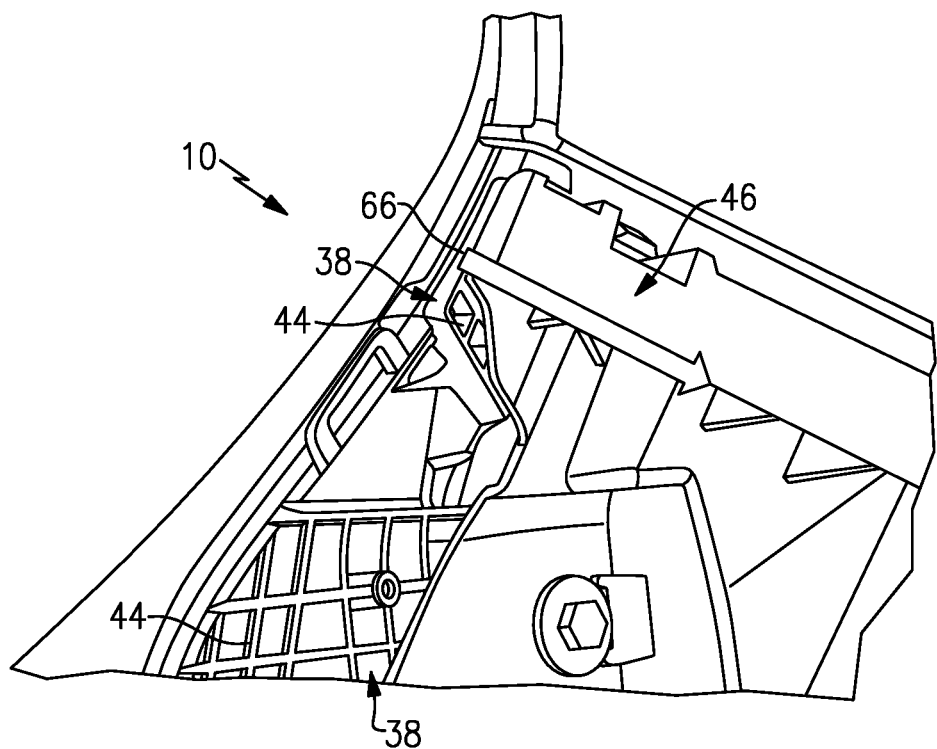
FIG. 7 is similar to FIG. 6 but shows the bumper mounting bracket as installed.

FIG. 6 shows the headlamp assembly 10 in a screwed-in position after the fender 32 has been moved outwards 64 as shown in FIG. 5. In order to protect the lens 12 from a sharp edge of the fender 32 during retraction, the headlamp assembly 10 has an additional deflector surface 38 on the housing 14, which keeps the fender 32 at a distance from the headlamp assembly 10 during retraction via the bumper mounting bracket 46. In one example, the bumper mounting bracket 46 is screwed to the fender 32 and is configured to prevent any scratching during movement. FIG. 6 has the bumper mounting bracket 46 removed to show the deflector more clearly. FIG. 7 includes the bumper mounting bracket 46 and shows a direction of movement 66 of the headlamp assembly 10 during retraction.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An apparatus, comprising:
a housing;
a headlamp comprising at least a lens portion fixed to the housing at a connection interface;
a fender supported by a vehicle structure relative to the housing such that an edge of the fender at least partially overlaps the connection interface; and
a deflector associated with the connection interface and configured to move the fender outwardly relative to the vehicle structure in response to an input load to the headlamp.

2. The apparatus of claim 1, wherein the headlamp extends from an inboard end near a bumper to an outboard end adjacent to the fender, and wherein the connection interface is at the outboard end.

3. The apparatus of claim 2, wherein, when the input load is applied to the inboard end, a pivot point area is created at a transition area between the outboard end of the headlamp and the fender.

4. The apparatus of claim 3, wherein, pivoting movement of the deflector during the input load results in direct contact between the deflector and an inner surface of the fender to push the fender outwardly in a lateral direction while moving the headlamp rearwardly in a longitudinal direction.

5. The apparatus of claim 1, wherein the fender is adhered to the housing and the connection interface comprises a flange area associated with the housing.

6. The apparatus of claim 5, wherein the edge of the fender extends outwardly of the connection interface to cover the flange area from external view.

7. The apparatus of claim 5, wherein the deflector comprises a polygonal body that is attached to a flange of the housing.

8. The apparatus of claim 7, wherein the polygonal body includes a ribbed structure.

9. The apparatus of claim 7, including a bumper mounting bracket that at least partially covers the polygonal body.

10. The apparatus of claim 1, wherein the deflector comprises a polygonal body that pivots in response to the input load and contacts an inner surface of the fender to move the fender outwardly in a lateral direction while moving the headlamp rearwardly in a longitudinal direction.

11. The apparatus of claim 1, wherein the edge of the fender at least partially overlaps the connection interface in a lateral direction but does not extend beyond the connection interface in a longitudinal direction.

12. The apparatus of claim 1, wherein the housing and the lens portion are adhered together at the connection interface.

13. A method comprising:
fixing at least a lens portion of a headlamp to a housing at a connection interface;
supporting a fender supported on a vehicle structure relative to the housing such that an edge of the fender at least partially overlaps the connection interface; and
associating a deflector with the connection interface such that in response to an input load to the headlamp, the fender moves outwardly relative to the vehicle structure.

14. The method of claim 13, wherein the headlamp extends from an inboard end to an outboard end, and including positioning the connection interface at the outboard end.

15. The method of claim 14, wherein, when the input load is applied to the inboard end, a pivot point area is created at a transition area between the outboard end of the headlamp and the fender.

16. The method of claim 15, wherein, pivoting movement of the deflector during the input load results in direct contact between the deflector and an inner surface of the fender to push the fender outwardly in a lateral direction while moving the headlamp rearwardly in a longitudinal direction.

17. The method of claim 13, including adhering the fender to the housing such that the connection interface comprises a flange area associated with the housing.

18. The method of claim 17, including extending the edge of the fender outwardly of the connection interface to cover the flange area from external view.

19. The method of claim 17, wherein the deflector comprises a polygonal body that is attached to a flange of the housing.

20. The method of claim 19, including forming the polygonal body to include a ribbed structure.

21. The method of claim 19, including mounting a bumper mounting bracket to at least partially cover the polygonal body.

22. The method of claim 13, wherein the deflector comprises a polygonal body that pivots in response to the input load and contacts an inner surface of the fender to move the fender outwardly in a lateral direction while moving the headlamp rearwardly in a longitudinal direction.

23. The method of claim 13, wherein the edge of the fender at least partially overlaps the connection interface in a lateral direction but does not extend beyond the connection interface in a longitudinal direction.

24. The method of claim 13, including adhering the housing and the lens portion together at the connection interface.

* * * * *